Nov. 21, 1933.  T. J. TAYLOR  1,936,529
SUPPORTING DEVICE
Filed June 29, 1932
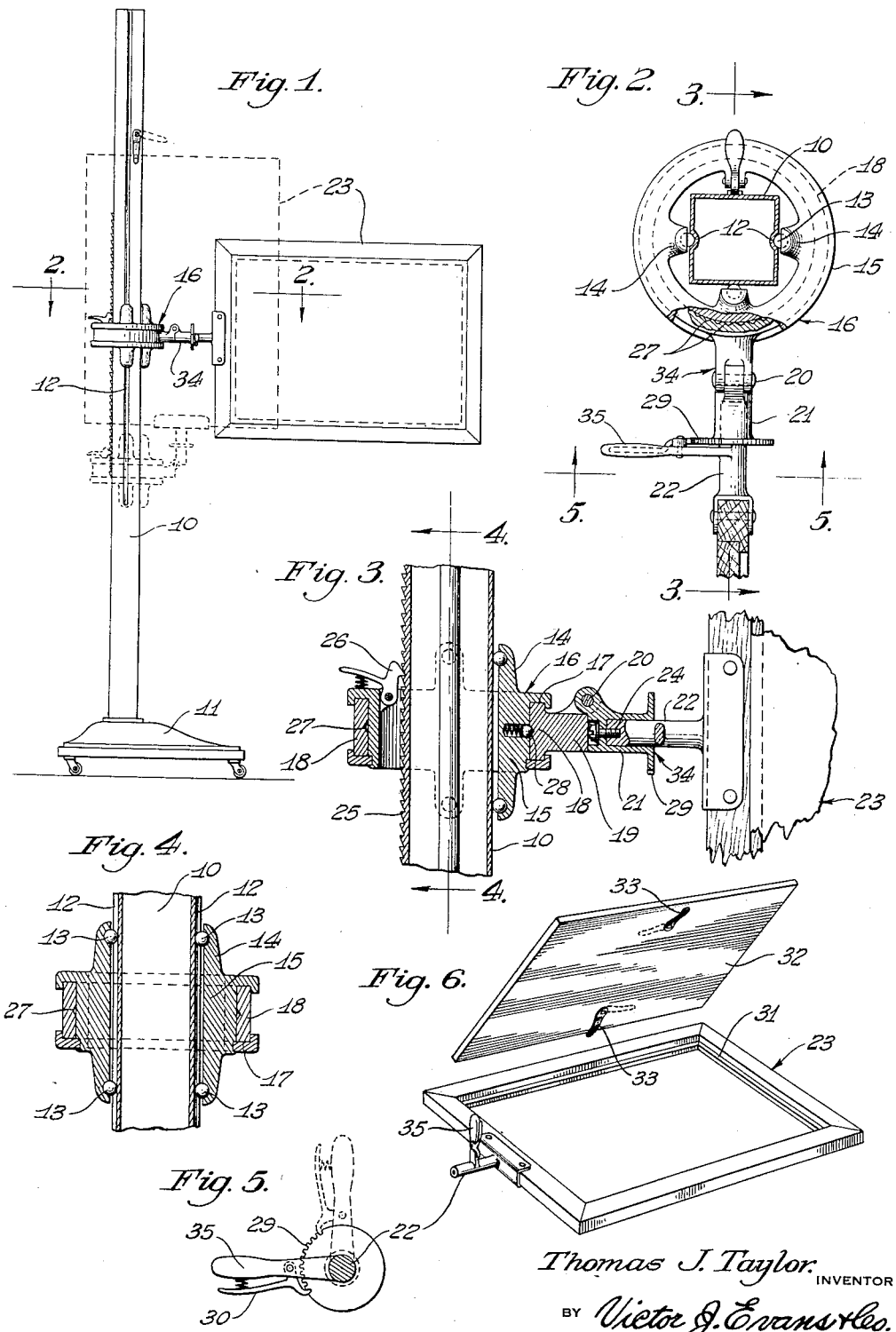
Thomas J. Taylor, INVENTOR
BY Victor J. Evans & Co.
HIS ATTORNEYS Patented Nov. 21, 1933

1,936,529

UNITED STATES PATENT OFFICE 1,936,529

SUPPORTING DEVICE

Thomas John Taylor, Chicago, Ill.

Application June 29, 1932. Serial No. 620,032

6 Claims. (Cl. 45—110)

This invention relates to certain novel improvements in supporting devices, and has for its principal object the provision of an improved construction of this character which will be highly efficient in use and economical in manufacture.

It is an object of this invention to provide an improved bedside supporting device adapted to support an invalid's reading or writing tray, table, or the like, and adjustable to various positions best suited to the needs and convenience of the user.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is an elevational view of a preferred form of the invention;

Fig. 2 is a horizontal sectional view on line 2—2 in Fig. 1;

Fig. 3 is a sectional view on line 3—3 in Fig. 2;

Fig. 4 is a sectional view on line 4—4 in Fig. 3;

Fig. 5 is a sectional bottom plan view on line 5—5 in Fig. 2; and

Fig. 6 is a perspective view of a preferred form of the new tray or table.

In the drawing 10 indicates an upright or standard that is mounted on a portable base 11. Provided in the external surface of the standard 10 are vertical grooves 12. Traveling in these grooves 12 are bearing elements 13 which are rotatably mounted in bosses 14 formed on the inner ring 15 of an adjustable supporting device generally indicated at 16.

Provided in the inner ring 15 is an annular groove 17 in which is rotatably mounted an outer ring 18 that is concentric with the ring 15. The outer ring 18 has a projecting tray supporting arm generally indicated at 34. This arm 34 includes a section 19 that is integral with the ring 18, and a tubular section 21 that is hingedly connected to section 19 at 20 for movement in a vertical plane.

The tubular section 21 telescopically receives the supporting bracket arm 22 of the tray or table-supporting frame 23. The arm 22 is latched to the tubular section 21 by a screw and socket connection 24 and is rotatable in a vertical plane at right-angles to said first-named plane.

A vertical rack of teeth 25 is provided in the vertical standard 10, and to hold the tray or table-supporting frame 23 at a preselected vertical height a spring-urged latching dog 26 is pivotally mounted on the inner ring 15 so as to latchingly engage the teeth 25.

The supporting frame 23 may be adjusted in a horizontal plane by rotating the outer ring 18 relative to the inner ring 15. To latch these two rings together and to hold the frame 23 in a preselected position an annular series of indentations 27 is provided on the inner periphery of the ring 18 and a spring-urged detent 28 is arranged in a recess in the inner ring 15 to engage in the indentations 27.

The supporting frame 23 may be used as an invalid's tray, a reading or writing desk, or for other purposes, and may be swung on the hinged connection 20 into dotted line position so as to occupy a minimum of space when not in use.

To provide for adjustment of the member 23 into an inclined or angular position relative to the horizontal, a rack segment 29 is provided on the tubular arm 21. Projecting from the arm 22 is a finger grip 35 to which is pivotally attached a spring-urged latching handle 30 having latching engagement with the rack segment 29 to hold the frame 23 at a preselected angle relative to the horizontal, whereby the frame 23 may be swung over the invalid's bed and adjusted for use as an invalid's reading or writing desk or the like.

The tray 23 may be of any suitable design, but I preferably provide an internal peripheral shelf 31 on the frame to support either the table top 32, a tray, or the like. The top 32 may be latched to the frame 23 by means of suitable latching elements 33.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. A bedside supporting device for an invalid's tray, writing table, or the like, comprising a portable base, an upright on said base provided with a rack of teeth, an inner ring encircling said upright and adjustable vertically thereon, an outer tray-supporting ring concentric with said inner ring and rotatable relative thereto in a horizontal plane, and a dog movably mounted on the said inner ring for latching engagement with said teeth.

2. A bedside supporting device for an invalid's tray, writing table, or the like, comprising a portable base, an upright on said base provided with a vertical rack of teeth, an inner ring encircling said upright and adjustable vertically thereon, an outer ring concentric with said inner ring and rotatable relative thereto in a horizontal plane, a tray-supporting arm carried by said outer ring, and a latching dog movably mounted on said inner ring for latching engagement with said teeth.

3. A bedside supporting device for an invalid's tray, writing table, or the like, comprising a portable base, an upright on said base, an inner ring encircling said upright and adjustable vertically thereon, an outer ring concentric with said inner ring and rotatable relative thereto in a horizontal plane, a supporting arm carried by said outer ring including a section integral with said outer ring, a tubular section hingedly connected to said first-named section, and a tray-supporting arm rotatably mounted in said tubular section.

4. A bedside supporting device for an invalid's tray, writing table, or the like, comprising a portable base, an upright on said base, an inner ring encircling said upright and adjustable vertically thereon, an outer ring concentric with said inner ring and rotatable relative thereto in a horizontal plane, a supporting arm carried by said outer ring including a section integral with said outer ring, a tubular section hingedly connected to said first named section for movement in a vertical plane, and a tray-supporting arm rotatably mounted in said tubular section for movement in a vertical plane at right-angles to the first-named plane.

5. A bedside supporting device for an invalid's tray, writing table, or the like, comprising a portable base, an upright on said base provided with a vertical rack of teeth, an inner ring encircling said upright and adjustable vertically thereon, an outer ring concentric with said inner ring and rotatable relative thereto in a horizontal plane, a tray-supporting arm carried by said outer ring, a dog movably mounted on said inner ring for engagement with said teeth for latching said rings at a preselected vertical height on said upright, and means for latching said rings together.

6. A bedside supporting device for an invalid's tray, writing table, or the like, comprising a portable base, an upright on said base, an inner ring encircling said upright and adjustable vertically thereon, an outer ring concentric with said inner ring and rotatable relative thereto in a horizontal plane, a supporting arm carried by said outer ring including a section integral with said outer ring, a tubular section hingedly connected to said first-named section, a tray-supporting arm rotatably mounted in said tubular section, and means for latching said supporting arm to said tubular section.

THOMAS JOHN TAYLOR.